United States Patent [19]

Subramaniam

[11] 4,316,222
[45] Feb. 16, 1982

[54] METHOD AND APPARATUS FOR COMPRESSION AND DECOMPRESSION OF DIGITAL IMAGE DATA

[75] Inventor: Ambati Subramaniam, Waterloo, Canada

[73] Assignee: NCR Canada Ltd. - NCR Canada LTEE, Mississauga, Canada

[21] Appl. No.: 101,347

[22] Filed: Dec. 7, 1979

[51] Int. Cl.³ .......................... H04N 7/12; H04N 1/00
[52] U.S. Cl. .......................... 358/261; 340/347 DD; 364/515
[58] Field of Search .......................... 358/261, 260; 340/347 DD; 364/515

[56] References Cited

U.S. PATENT DOCUMENTS

| | | | |
|---|---|---|---|
| 3,510,576 | 5/1970 | Centanni | 358/261 |
| 3,748,379 | 7/1973 | Epstein | 358/261 |
| 4,035,937 | 9/1977 | Starck et al. | 358/261 |
| 4,047,228 | 9/1977 | Yagishita et al. | 358/261 |
| 4,053,930 | 10/1977 | Ogawa | 358/261 |
| 4,056,828 | 11/1977 | Furuta | 358/260 |
| 4,092,675 | 5/1978 | Saran | 358/261 |
| 4,092,676 | 5/1978 | Saran | 358/261 |
| 4,135,214 | 1/1979 | Weber | 358/261 |
| 4,136,363 | 1/1979 | Saran | 358/261 |
| 4,149,192 | 4/1979 | Takewchi | 358/261 |
| 4,152,697 | 5/1979 | Rider et al. | 358/261 |
| 4,167,758 | 9/1979 | Rothgordt | 358/261 |
| 4,193,097 | 3/1980 | Kwrahavashi et al. | 358/261 |
| 4,207,599 | 6/1980 | Murayama et al. | 358/261 |

*Primary Examiner*—Robert L. Richardson
*Assistant Examiner*—Edward L. Coles
*Attorney, Agent, or Firm*—J. T. Cavender; Albert L. Sessler, Jr.; Jerrold J. Litzinger

[57] ABSTRACT

A digital image data compression system which generates a plurality of run length symbols, with each symbol comprising a white portion and a black portion. The white portion may contain up to a specified maximum number of white pixels, while the black portion may contain up to a second specified maximum number of black pixels. A symbol may be composed of a black portion followed by a white portion (a BW type run), or a white portion followed by a black portion (a WB type run). If the second portion of any run length of a particular type run exceeds the maximum number of pixels allowed for that color, that run length is terminated at the maximum number, the corresponding symbol is generated, and a special symbol, indicating a change in the type of run, is inserted. The symbol following the special symbol, which is the opposite type from the original symbol, is generated using the remaining pixels from the last run length and the following run length of the opposite color. The symbols are used to provide address data for memory devices which generate variable length code words that are transmitted to a receiving station and decoded to provide symbols which are used to form a facsimile image.

22 Claims, 9 Drawing Figures

| RUN LENGTH | RUN FEATURE | ENCODING SYMBOL | BINARY PROM ADDRESS | VARIABLE LENGTH CODE WORD |
|---|---|---|---|---|
| 01 | 1,0 | 8 | 1000 | 111 |
| 011 | 1,1 | 9 | 1001 | 011 |
| 01111111 | 1,6 | 14 | 1110 | 1010 |
| 011111111 | 1,7 | 15 | 1111 | 10111 |
| 001 | 2,0 | 16 | 10000 | 01001 |
| 001111111 | 2,6 | 22 | 10110 | 110011 |
| 0011111111 | 2,7 | 23 | 10111 | 110000 |
| 0001 | 3,0 | 24 | 11000 | 100111 |
| 00...0 1 11...11 <br> 8    7 | 8,7 | 71 | 1000111 | 100001 |
| 00...0 11 <br> 139 | 139,1 | 1113 | 10001011001 | 11000100 |
| 00...0 1 111111 <br> 500    7 | 500,7 | 4007 | 111101001111 | 01010100 |
| 000...00 <br> 511 | 511,0 | 4088 | 111111111000 | 01011000 |
| 0000..1 <br> 511 | 511,1 | 4089 | 111111111001 | 01000110 |
| 00...0 111111 <br> 511 | 511,6 | 4094 | 111111111110 | 00101001 |
| 00...00 111111 <br> 511 | 511,7 | 4095 | 111111111111 | 00101010 |

FIG. 2B

| RUN LENGTH | RUN FEATURE | ENCODING SYMBOL | BINARY PROM ADDRESS | VARIABLE LENGTH CODE WORD |
|---|---|---|---|---|
| 10 | 1,0 | 512 | 1000 | 10 |
| 100 | 1,1 | 513 | 10000 | 1100 |
| 10 00000..00 (511) | 1,511 | 1023 | 111111111 | 01000 |
| 110 | 2,0 | 1024 | 100000000 | 111000 |
| 1100 | 2,1 | 1025 | 1000000001 | 001111 |
| 110 00...000 (511) | 2,511 | 1535 | 1011111111 | 001110 |
| 1110 | 3,0 | 1536 | 1100000000 | 111010 |
| 1110 000...00 (510) | 3,510 | 2046 | 1111111110 | 110110 |
| 1110 00...00 (511) | 3,511 | 2047 | 1111111111 | 110100 |
| 110 0000 (199) | 2,199 | 1223 | 10011000111 | 11111100 |
| 11111000 | 5,2 | 2562 | 101000000010 | 00100100 |
| 11111110 | 7,1 | 3585 | 111000000001 | 00110111 |
| 11111111000 | 7,3 | 3587 | 111000000011 | 00100101 |
| 11111111 00·0·0 (511) | 7,511 | 4095 | 111111111111 | 00001101 |

METHOD AND APPARATUS FOR COMPRESSION AND DECOMPRESSION OF DIGITAL IMAGE DATA

BACKGROUND OF THE INVENTION

This invention relates generally to a method and apparatus for data compression and decompression and, in particular, to a novel data compression and decompression method and apparatus for reducing the number of bits of information when transmitting a video image.

There are a number of types of apparatus and methods in existence for the compressing of digital data. One technique which has proven useful in compacting digital image data is run length encoding. This particular technique consists of partitioning each row (scan line) of the image or array into a sequence of runs, with each run including one or more adjacent picture elements, called pixels, with the same binary value, and representing each run with a symbol or code which specifies the length of the run. Often, these symbols are represented by variable length codes, such as a Huffman code set, and are assigned such that the shorter code words are used to represent the symbols which are more likely to occur, and the longer code words stand for symbols which rarely appear.

Another feature of data compression which is important is reversibility of the process. A process which is reversible may be described as one which not only reduces the amount of data of a facsimile image before transmission but also enables the reconstruction of the original image without losing the information content of that data, whereas an irreversible process is one in which a certain portion of the data is irreversibly lost during data compression. A reversible process is preferred, since it will provide a more accurate image after decompression of the image data.

Another factor which is significant to data compression efficiency concerns data at the end of a scan line. Many compression methods require an end of line character to aid in the proper reconstruction of the compressed data at the decompression end. However, if a continuous encoding method is employed, compression can be continued from line to line, which will improve the compression ratio considerably.

SUMMARY OF THE INVENTION

It is therefore an object of the present invention to provide a novel method and apparatus for data compression and decompression which are highly efficient and also easily implemented in hardware.

Another object of the present invention is to provide a method for compressing data which accomplishes the transmission of image data without any losses.

Still another object of the present invention is to provide a new and improved method of data compression which is continuous from line to line.

These and other objects are accomplished in the present instance by using a novel encoding apparatus and method which, when implemented by conventional hardware devices, compresses data representative of facsimile images with a high degree of efficiency. The encoding method is based on a run length symbol which combines a group of data indicia of a first type with an adjacent group of data indicia of a second type. This run length is classified according to whether the group of data indicia of the first type is first in the run, or whether the data indicia of the second type precede the indicia of the first type. These combined run length symbols are used to address an encoder PROM (programmable read-only memory) in which a series of variable-length code words are stored. These code words are assigned to their corresponding symbol addresses based upon their frequencies of occurrence.

The variable length code words are transmitted serially or in bytes to a decompressor, where they are converted back to the original run length symbols by a decoder PROM, and finally reconstructed to form the facsimile image.

DETAILED DESCRIPTION OF THE PREFERRED EMBODIMENT

It is well-known that an image may be divided into a series of rows of data elements of different types, such as black and white colors, which can be scanned by a device having an elemental area resolution enabling it to distinguish between the black and white elemental areas. The output of this scanning device is in digital form in which the white elements normally cause a "0" output signal to be generated and the black elements produce a "1" output signal.

Figure 1:
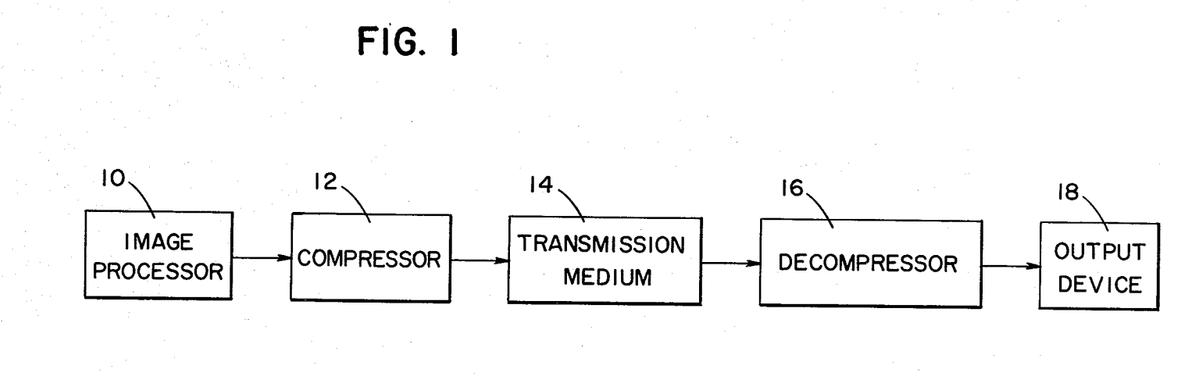
FIG. 1 is a block diagram of a data transmission system suitable for use with the present invention.

Data in this form can be compressed and conveyed via a transmission network to a remote receiver which will reconstruct the data to form an original image. FIG. 1 shows the overall arrangement of a typical system in which this can be accomplished. However, it is desirable to encode the data so that the image can be reconstructed by transmitting the fewest bits possible.

Referring now to FIG. 1, an image lift unit and processor 10 scans a facsimile image which is to be transmitted and converts the original image data into strings of ones and zeros. Image processor 10 in the present embodiment is a flying spot scanner of wellknown construction, although another type of scanning system may be employed to provide the required data output. The data is sent in this form to a compressor 12, where it is transformed into a series of variablelength code words, and then transmitted over a transmission medium 14. The data is received at the other end of medium 14 by a decompressor 16, where it is reconverted, from the variable-length code words, into the original image and then transmitted to an output device 18, such as a CRT screen, where a reconstructed image of the original can be displayed.

When working with checks or other similar documents, the image processor often converts the original image data into long strings of 0's followed by short strings of 1's, and short strings of 1's followed by long strings of 0's. These characteristics make it possible to develop a method of encoding which generates two types of run lengths. In the illustrated embodiment, one is a white-black (WB) run, and the other is a black-white (BW) run. Each of these runs has two sections, called a black half and a white half.

The WB run length consists of a white half run of from 1 to 511 pixels, followed by a black half run of from 0 to 7 pixels. The BW run length consists of a black half run of from 1 to 7 pixels followed by a white half run of from 0 to 511 pixels. Thus, the maximum value for a white half run is 512 (0 to 511), and the maximum value of a black half run is 8 (0 to 7). These maximum lengths were determined experimentally to be optimum for processing check images. However, these maximum limits may be chosen to optimally suit the type of images to be processed.

Figure 2A:
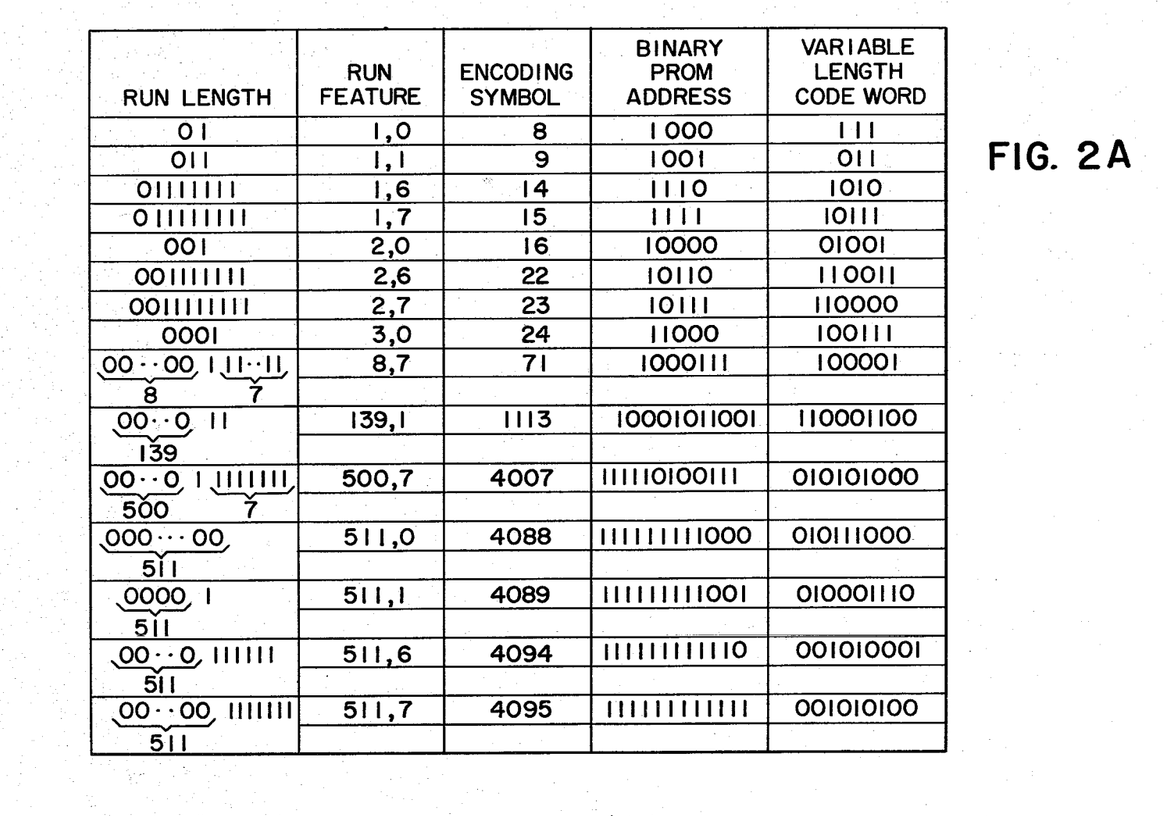
FIGS. 2A and 2B together show a chart which shows selected run lengths with corresponding features of the coding scheme employed for the facsimile system according to the present invention.
Figure 2B:
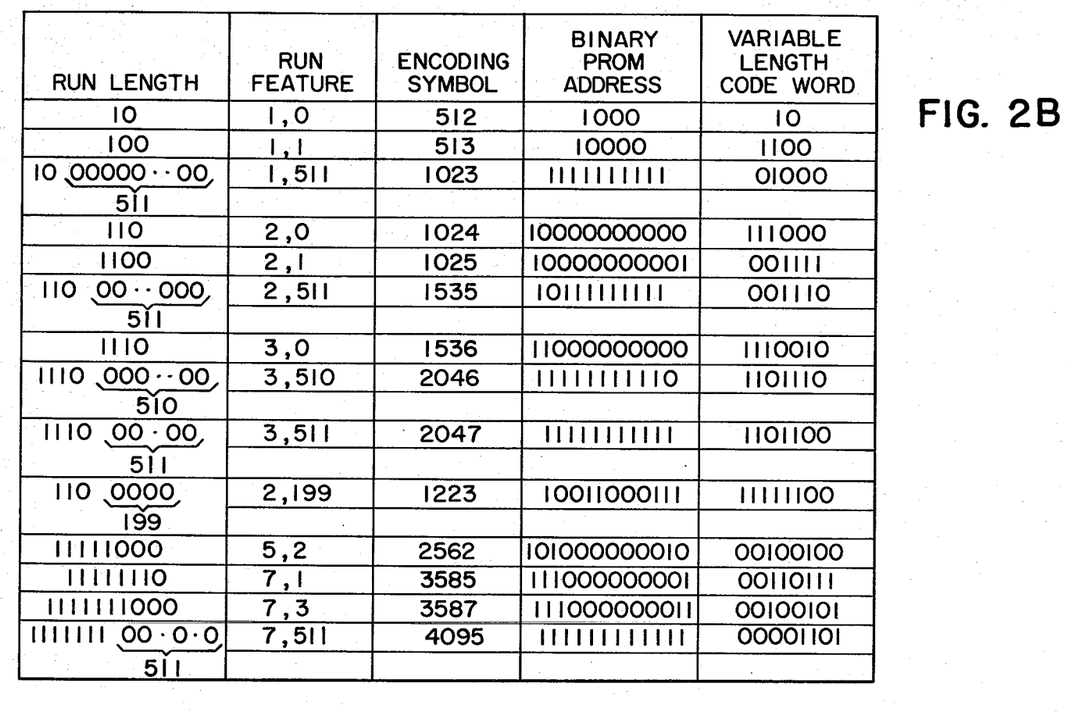

The encoding scheme for the present invention can be expressed by the following equations:

$$S = (x \cdot M_2) + y \text{ for WB runs;} \quad (1)$$

$$S = (x \cdot M_1) + y \text{ for BW runs;} \quad (2)$$

where S is the encoding symbol, x is the length of the first half of a particular run, y is the length of the second half of that same run, $M_1$ is the maximum length of a white half run, and $M_2$ is the maximum length of a black half run. FIGS. 2A and 2B comprise a chart showing several sample run lengths of WB and BW runs with corresponding run features, encoding symbol values, and corresponding code words used in the present embodiment.

In the illustrated embodiment, the encoding symbol values are used to provide binary addresses to a storage unit (PROM), from which code words are outputted to make up the compressed data which is transmitted to a remote unit and there decompressed. The code words transmitted to the remote unit are utilized as part of an address to access a storage unit at the decompressor which cooperates with other components to reconstitute the original image.

This combined black and white run length encoding scheme is easily implemented by following several rules. These rules make it possible to use this novel encoding scheme to achieve substantial compression performance.

The general rule of this encoding scheme is that the first half of any run feature must be terminated before the second half may begin. For example, the black half of a BW run length is terminated by a zero before the white half is generated. To demonstrate this rule, consider a group of five black pixels followed by three white pixels in a BW run length (11111000). The first white pixel following the black half is used to terminate the black half run before the white half is started. The remaining two white pixels constitute the white half run. The run feature for this particular BW run length is coded (5,2) and, using equation #2, the encoding symbol is calculated to be 2562, as shown in FIG. 2B. Another situation where this rule is applied is illustrated by a WB run length in which eight white pixels are followed by eight black pixels (0000000011111111). Here, the white half must be terminated by a one before the black half can be generated. Therefore, the first black pixel following the eight white pixels is used to terminate the white half run. The remaining seven black pixels comprise the black half run. The run feature for this WB run length is (8,7), and the encoding symbol using equation #1 is 71, as shown in FIG. 2A.

An exception to this general encoding rule applies when the length of the first half of a run exactly equals the maximum number of pixels allowed for that particular color. To illustrate this, consider a BW run length of seven black pixels followed by three white pixels (1111111000). Since $M_2$, which is the maximum value for a black half run, is equal to 8, the maximum number of pixels allowed in this black half run is 7. In the example, therefore, the first half run length exactly equals the maximum allowable number of pixels for that color. When this situation occurs, the first half of the run length does not have to be terminated, and the second half begins with the next pixel. In the example, all three white pixels constitute the second half of the run length, and the run feature for this particular run length is coded (7,3) and the corresponding encoding symbol, using equation #2, is 3587, as shown in FIG. 2B.

If the first half of a run length exceeds the maximum length specified for that particular color, then that run length must be broken down by using both the general rule and its exception. For example, take the situation in which a sequence of a series of 650 white pixels followed by two black pixels is encountered when the system is in the WB mode. Since the maximum number of pixels allowed in a white half run is 511, the white run length exceeds the maximum in this example. This situation is solved by using the first 511 pixels of the white run for the white half of the WB run, and using a length of 0 for the black half, which follows the exception to the general rule. The run feature for this WB run length is coded (511,0), which provides an address of 4088 for the PROM for the code word representing the first part of this sequence. The remaining 139 white pixels may be combined with the two black pixels in a WB run length by using the general rule. The run feature for this WB run length is coded (139,1), which provides a PROM address of 1113 for a second code word representing the remainder of the sequence.

If the second half of a run length exactly equals the maximum length allowed for that particular color, then that run length may be encoded following the general encoding rule. However, if the second half of a run length exceeds the maximum allowable length, a special method must be used to encode the data.

When the second half of the run exceeds the maximum, the run length is encoded for the maximum length allowed for that color, then a special symbol is generated to provide a further PROM address, which indicates the symbol has switched to the opposite type run. The remaining pixels are then encoded as the first half run of the opposite type run length by following the general rule. To illustrate this situation, consider a run in the WB mode which contains 500 white pixels, followed by 10 black pixels, which are followed by 200 white pixels. The 500 white pixels are terminated by the first black pixel, and the next seven pixels, which is the maximum number of pixels allowed for a black half run, are combined with the previous white pixels to generate a WB run which is a run feature coded (500,7) to provide a PROM address of 4007. Following this run length, the special symbol is generated, constituting an address for a code word which indicates that the run pattern is switching from WB runs to BW runs. After the special symbol, the remaining two black pixels are combined with the next run of 200 white pixels following the general rule to generate a BW run which has a run feature coded (2,199) for a PROM address of 1223. The coding method now continues using BW runs until it is necessary to switch back to the WB run length.

Figure 3A:
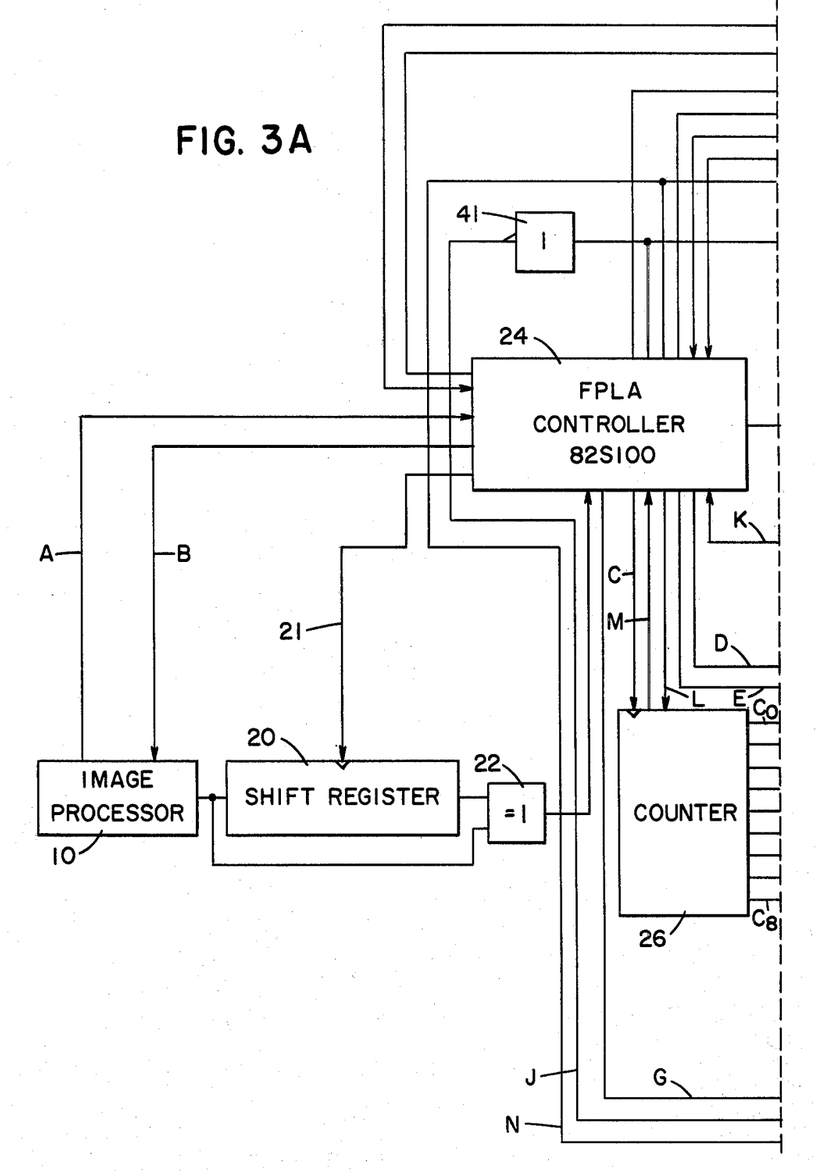
FIGS. 3A-C, inclusive, taken together, show the circuitry for the compressor hardware used in the present embodiment.
Figure 3B:
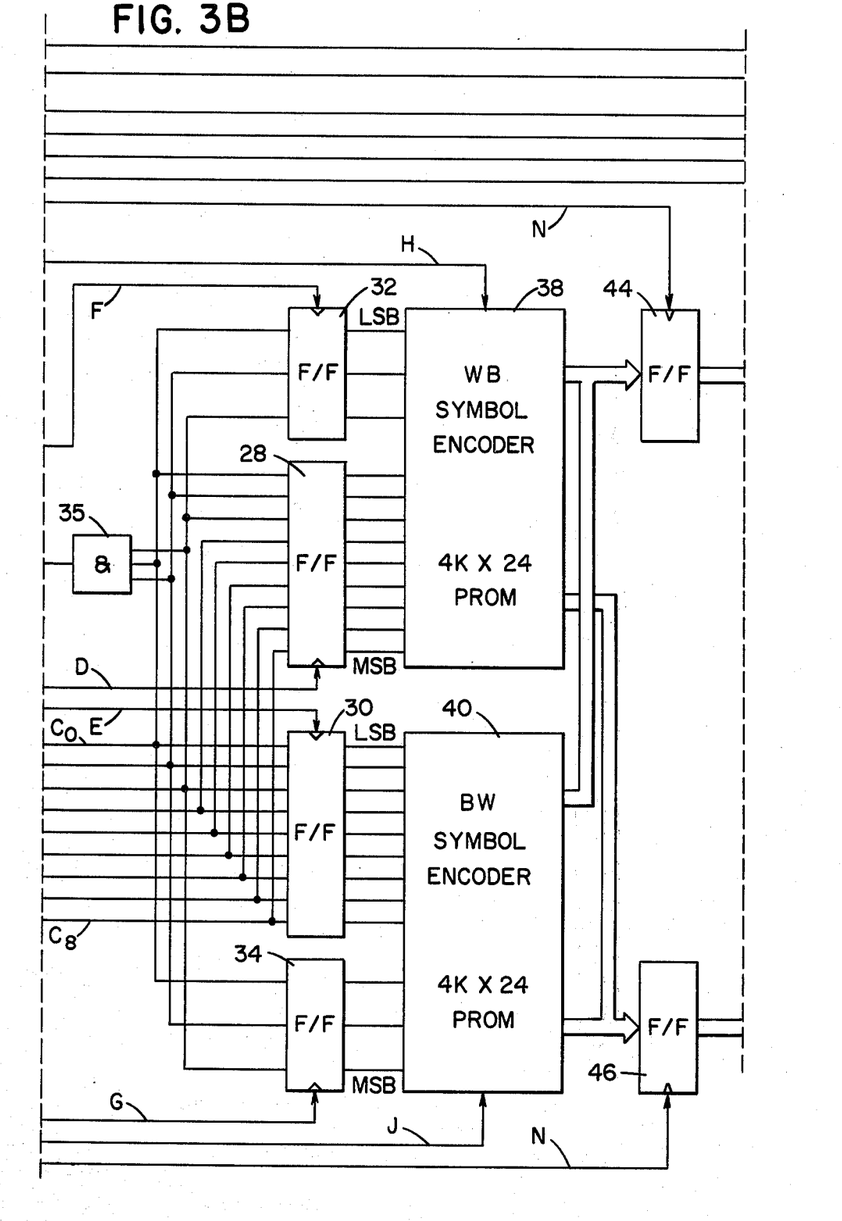
Figure 3C:
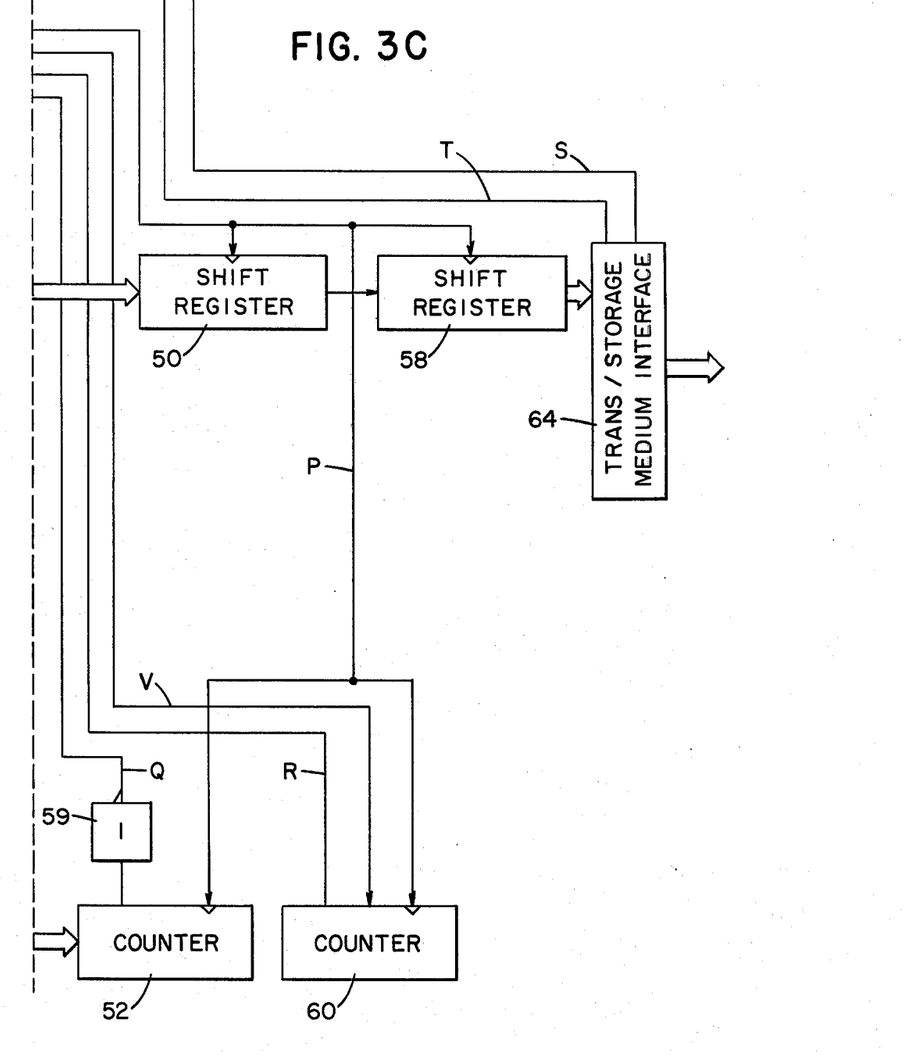

Referring now to FIGS. 3A–C, a detailed embodiment of the compressor hardware 12 (FIG. 1) is shown. The preprocessed data from the image processor 10 is transmitted serially to a shift register 20. Shift register 20 is selected such that its length is equal to the number of pixels contained in one scan line of the image which is being compressed. For example, if the two-dimensional image contains M scan lines with N pixels in each scan line, the length of shift register 20 would be N bits. The purpose of shift register 20 is to provide a one scan line delay of the pixels before they are transmitted to an EXCLUSIVE OR gate 22.

The output of shift register 20 is connected to one input of gate 22, and the other input to gate 22 is connected directly to the output of the image processor 10. Shift register 20 is clocked by a signal 21 from a controller 24. Gate 22 removes the line-to-line redundancies by performing the EXCLUSIVE OR operation on a pixel-by-pixel basis on corresponding pixels located in two adjacent lines; thus, instead of transmitting each line of data, gate 22 transmits only the changes occurring from line-to-line. This operation, sometimes called predictive differential quantizing or delta coding, further improves the compression of the present embodiment, especially if there are many identical adjacent rows located on the original image. Thus, gate 22 may be considered a differential image generator, since the data which is outputted from gate 22 represents a different image than the original image which is outputted from image processor 10. Therefore, any pixels outputted from gate 22 constitute data from the differential image, and are not necessarily the same as the corresponding pixels of the original image which were outputted by image processor 10.

In the present embodiment, a simulated scan line containing all 0's is inserted into shift register 20 for comparison with the first actual scan line of data from the original image. This insures that the first actual line of data will be compared by gate 22 with a row of zeroes, causing the output of gate 22 to be the actual data found in the first scan line, and giving the decoding hardware a known starting point from which to work.

The output of gate 22 is transmitted to controller 24. Controller 24, a field programmable logic array (FPLA), provides all the timing and control signals for the compression hardware. The FPLA, which may be a Signetics 82S100 integrated circuit chip, can be programmed such that a desired signal is outputted from the chip in response to a sequence of signal inputs to the chip, as is well-known in the art. As each bit of data is outputted from the image processor 10, a control signal A is transmitted from image processor 10 to controller 24 to indicate that a bit of data has been outputted to shift register 20. When the data has been received by controller 24, a signal B is transmitted to the image processor 10, confirming that the data has been received. The image processor 10 is inhibited from sending the next bit of data until it receives the acknowledgement signal B from controller 24. If no acknowledgement is received, the system will be halted. This technique, known in the art as handshaking, insures that a breakdown will not result in the transmission of erroneous data.

For each bit of data of a run length which is transmitted serially from gate 22 to controller 24, controller 24 transmits a clock pulse C to a counter 26, which is a 9-bit up counter, causing it to increment. All nine bits of the output ($C_0$–$C_8$) of counter 26 are presented to both of a pair of multiple flip-flops 28 and 30. In addition, the three least significant bits of counter 26 are presented to both of a pair of multiple flip-flops 32 and 34 and to an AND gate 35, which gate is used to detect the maximum length for a black half run. Flip-flops 28 and 30 latch the run data from counter 26 which represents the number of zeroes (white pixels) outputted in a run of the differential image from gate 22, with flip-flop 28 used to generate WB symbols for encoding the data, and flip-flop 30 for generating BW symbols. Flip-flops 32 and 34 receive runs from counter 26 representative of ones (black pixels) of the differential image outputted from gate 22, with flip-flop 32 used to generate WB symbols, and flip-flop 34 for generating BW symbols.

In operation, as the pixels of the differential image for a particular color are outputted from gate 22 to controller 24, counter 26 is incremented once for each pixel contained in that run. When controller 24 detects a change of color in the data from gate 22, controller 24 transmits a signal D, E, F, or G to that one of the flip-flops 28, 30, 32, 34 which stores the number of pixels of the specified color in that particular type of run, causing data from counter 26 to be latched into the appropriate flip-flop. In the preferred embodiment, flip-flop 28, which represents the white half of a WB run length, is clocked by signal D; flip-flop 30, which represents the white half of a BW run length, is clocked by signal E; flip-flop 32, which represents the black half of a WB run length, is clocked by signal F; and flip-flop 34, which represents the black half of a BW run length, is clocked by signal G.

Referring now to FIG. 3B, the outputs of flip-flops 32 and 28 are connected in parallel to a PROM 38 with the first output bit of flip-flop 32 forming the least significant bit (LSB) of the address to PROM 38, and the last output bit of flip-flop 28 forming the most significant bit (MSB) of the address; the outputs of flip-flops 30 and 34 are connected in parallel to a PROM 40, with the first output of flip-flop 30 forming the least significant bit (LSB) of the address to PROM 40, and the last output bit of flip-flop 34 forming the most significant bit (MSB) of the address. These PROMS are both 4K×24 bit memory devices. PROM 38 contains the variable-length code words, such as a Huffman code set, associated with WB symbols, while PROM 40 stores the variable length code words related to BW symbols. PROM 38 is enabled by a control signal H from controller 24; signal H is also transmitted through an inverter gate 41 to generate a signal J, which enables PROM 40. In the present embodiment, the compression process always begins in the WB mode. If the first symbol to be generated is a BW symbol, the special symbol must be generated before the BW symbol can be started.

To illustrate the operation of counter 26, consider a WB run consisting of two white pixels followed by two black pixels, which are followed by a run of white pixels, while the system is operating in the WB mode. As these pixels are outputted serially from gate 22, they are received by controller 24. When the first white pixel is received by controller 24, counter 26 is incremented once by signal C, and the output of the counter becomes a one on the least significant bit line ($C_0$). As the second white pixel is received by controller 24, counter 26 is incremented again, causing the output of the counter to become a one on the $C_1$ output line. The next bit received by controller 24 is a black pixel, which represents a change of state in the data. Upon receiving this black pixel, controller 24 transmits signal D to flip-flop 28, causing the output of counter 26 to be latched into this flip-flop. Next, controller 24 transmits signal L to reset counter 26 to zero. The next bit received by controller 24 is another black pixel, which causes controller 24 to transmit signal C to increment counter 26, placing a one on the $C_0$ output line. When the next pixel is received by controller 24, which is a white pixel, it transmits signal F to flip-flop 32, latching in the output of counter 26. Since the controller is operating in the WB mode, it now transmits signal H to PROM 38, causing the binary number formed by the outputs of flip-flops 32 and 28, which is 10001 (the encoding symbol for a WB run length of (2,1) as shown in FIG. 2A), to address the PROM. Controller 24 then transmits signal L to clear counter 26, and the controller is now ready to generate the next run length.

When a black half run length reaches the maximum allowable number of pixels, it is necessary to determine the color of the following pixel in order to correctly terminate the run. At this time the three least significant bits of counter 26 become high (1), and the output of gate 35 transmits a signal K to controller 24. Since gate 22 is currently outputting a series of ones, indicating a black run, controller 24 examines the next bit of data which arrives from gate 22. If the next data bit from gate 22 is a zero, controller 24 outputs a control signal to either flip-flop 32 or 34, depending on which type of run length, BW or WB, is currently being received, to latch the output from counter 26 into the proper flip-flop. However, if the next data bit from gate 22 is a one, then controller 24 must handle the data in a different manner, depending on the type of run length being generated at the time.

If controller 24 is generating BW runs when it receives the next data bit 1 from gate 22, it sends signal G to flip-flop 34, latching in the outputs of the three least significant lines of counter 26, which will be all ones. Next it transmits a signal L to clear counter 26, then it transmits signal E to flip-flop 30, latching in all zeros. Finally controller 24 transmits signal J, enabling PROM 40 and allowing the outputs of flip-flops 30 and 34 to address PROM 40. This causes the white half of the BW run to be zero, following the encoding rules which were discussed previously.

If controller 24 is currently generating WB runs, a special symbol must be generated to allow the encoding system to be changed to generate BW runs. When controller 24 receives the next data bit 1 from gate 22, it transmits signal F to flip-flop 32, latching all ones in the three least significant bits of the output from counter 26. Since the white half of the WB run will have already been latched into flip-flop 28, controller 24 now transmits signal H to PROM 38, causing the code word corresponding to the address provided by the outputs of flip-flops 28 and 32 to be outputted from PROM 38 to be further processed in a manner which will be subsequently described in greater detail. Next it transmits signal L to counter 26, clearing the output. With counter 26 cleared, controller 24 transmits signal D to flip-flop 28 and signal F to flip-flop 32, latching in all zeroes from counter 26, and making the address to PROM 38 000000000000, which is the address for the special symbol. PROM 38 is then enabled by signal H from controller 24, causing the variable length code word representing the special symbol to be outputted.

When a white half run length reaches the maximum allowable number of pixels, it is necessary to determine the color of the following pixel in order to correctly terminate the run. At this time counter 26 has reached its maximum count, with ones on all nine output lines, and it transmits an overflow signal M to controller 24. Controller 24 must now examine the next bit it receives from gate 22. If this bit is a one, indicating a change of color in the data, controller 24 either outputs a signal D to flip-flop 28 (if the system is currently generating WB runs) or outputs signal E to flip-flop 30 (if the system is currently generating BW runs) to latch in to the selected flip-flop the output of counter 26. Controller 24 next outputs signal L to clear the contents of counter 26, and then continues to increment counter 26 via signal C as it receives additional data from gate 22. However, if the next bit of data is a zero, controller 24 must terminate the white run before it can output this bit.

If controller 24 is generating WB runs when it receives the zero data bit from gate 22 after the white half run has reached its maximum length, it transmits signal D to flip-flop 28, latching in the nine output bits from counter 26. Next it transmits signal L to counter 26, resetting the counter output lines to zero, then it transmits signal F to flip-flop 32, latching all zeroes into this flip-flop. Finally, it transmits signal H to PROM 38, causing that PROM to output the variable-length code word corresponding to the twelve bit address formed by the outputs of flip-flops 32 and 28.

If, however, controller 24 is generating BW runs, the special symbol must be generated to allow the encoding system to switch to generating WB runs. In this situation, when controller 24 receives the zero data bit from gate 22, it transmits signal E to flip-flop 30, latching in all ones from the output of counter 26. Controller 24 then transmits signal L to counter 26 to clear its output. Since the black half of the BW symbol will have already been latched into flip-flop 34, controller 24 now transmits signal J to enable PROM 40 to output the code word for the address comprised by the outputs of flip-flops 30 and 34. When this PROM output has been transmitted, controller 24 transmits signal G to flip-flop 34, and signal E to flip-flop 30 latching in all zeroes from counter 26, creating an address of 000000000000 to PROM 40, which is the address of the special symbol. PROM 40 is now enabled by signal J from controller 24, causing the variable-length code word for the special symbol to be outputted.

The twenty-four bit PROM contents consist of a nineteen bit code word and a five bit code length. The first nineteen output bits of each PROM are connected to a flip-flop 44, as shown in FIG. 3B. These nineteen bits contain the variable-length code words which are outputted from a PROM in response to a particular address, and are clocked into flip-flop 44 in parallel by a control signal N from controller 24. However, since the code words are variable in length, not all of the nineteen bits will represent the code word. Therefore, the last five output bits of each PROM which represent the length of the code word, are used to specify the number of bits actually to be used of the nineteen bit PROM output to form the code word. These five bits from each PROM are transmitted to a flip-flop 46, and are clocked into flip-flop 46 in parallel by signal N from controller 24. The output of flip-flop 44 is connected to a shift register 50, which is a parallel in-serial out device, while the output of flip-flop 46 is connected to a five bit down counter 52. Both shift register 50 and counter 52 are clocked by a control signal P from controller 24. Each time that signal P pulses, shift register 50 outputs one bit of data to a shift register 58, which is a serial in-parallel out device, (also clocked by signal P), and at the same time, the number (representing the number of bits in the code word) stored in counter 52 is decremented one count. When counter 52 is clocked to zero by signal P, a signal Q is transmitted to controller 24 via an inverter gate 59, signifying that the complete code word which was stored in shift register 50 has been outputted to shift register 58.

Control signal P is also transmitted to a three-bit up counter 60. Counter 60 is clocked by signal P until it receives eight pulses, at which time it transmits a signal R to controller 24, signifying that an eight bit byte of data has been stored in a transmission/storage medium interface 64 from shift register 58. As each byte of data is received by interface 64, the interface communicates with controller 24 via signals S & T, using the handshaking technique discussed previously, to insure that the compressed data will be transmitted properly. This data can now be sent over the transmission medium 14 in a manner well-known in the art to the decompression hardware 16. Signal V is then generated by controller 24 to reset counter 60.

Figure 4A:
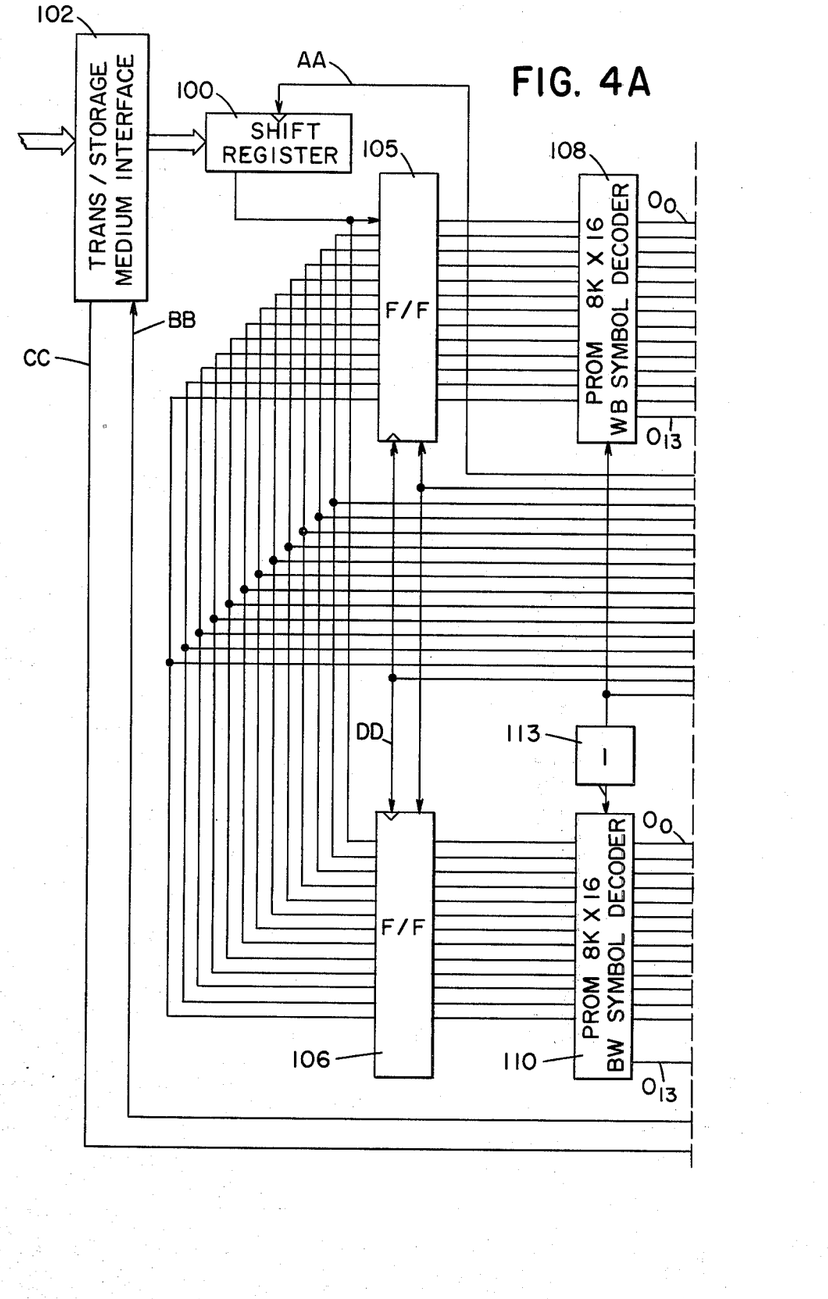
FIGS. 4A-C, inclusive, taken together, show the circuitry for the decompressor hardware used in the present embodiment.
Figure 4B:
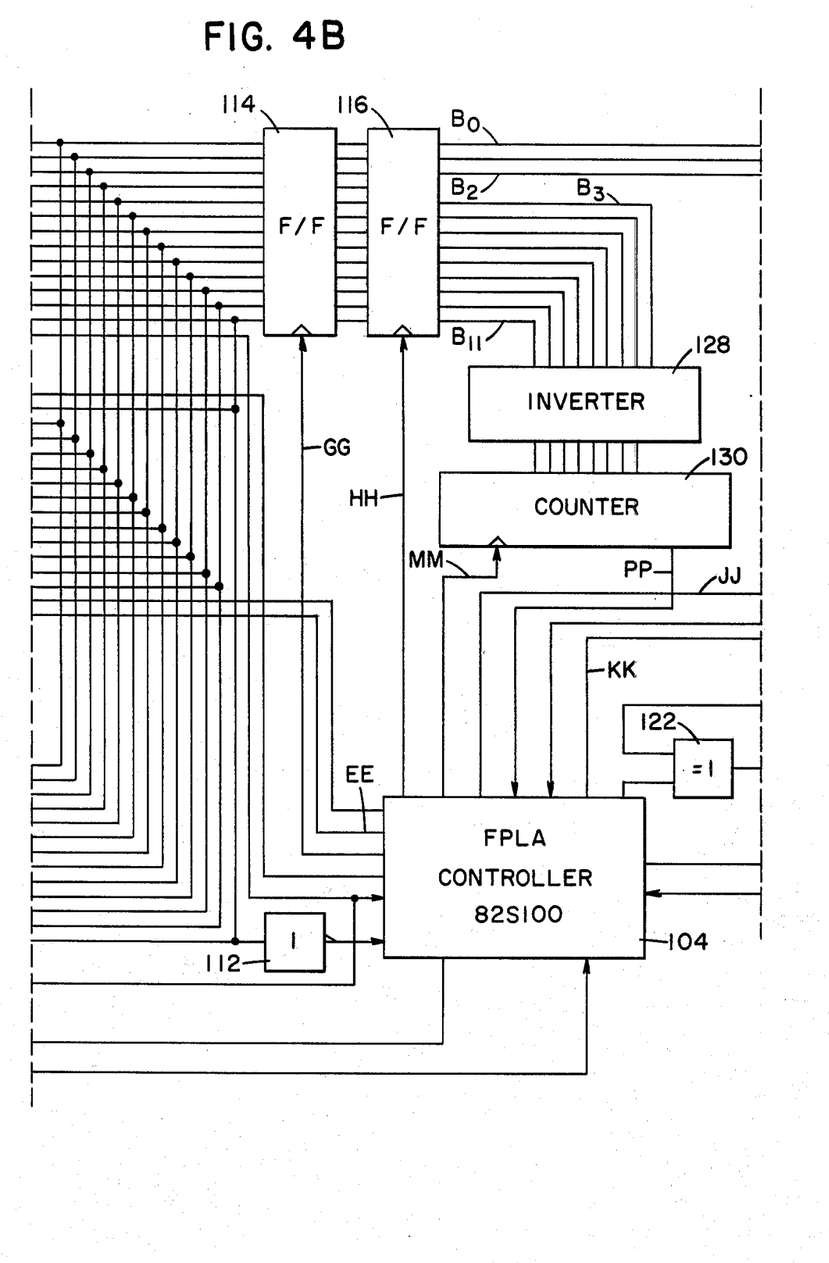
Figure 4C:
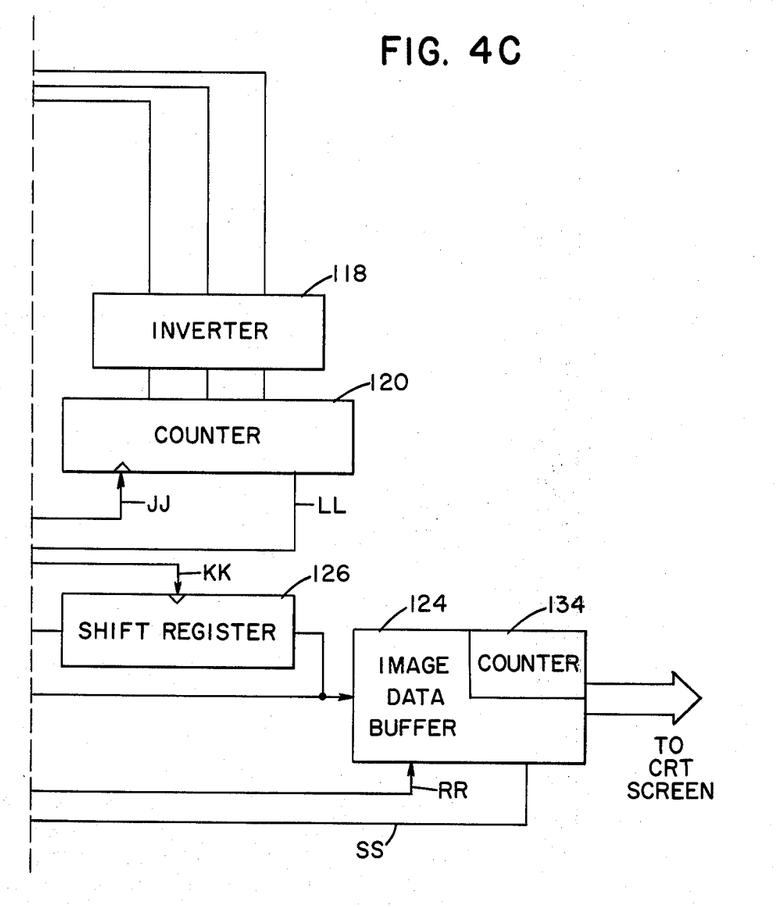

Referring now to FIGS. 4A, 4B, and 4C, there is shown a detailed embodiment of the decompression hardware. The byte of data is received from the transmission medium 14 by shift register 100 via a transmission/storage medium interface 102. Shift register 100, a parallel in-serial out device, receives the eight bits of data in parallel from interface 102. Each bit is clocked out serially by a control signal AA from a controller 104, which may be a Signetics 82S100 field programmable logic array (FPLA), and which provides the timing and control signals for the decompressor. Controller 24 communicates with interface 102 via signals BB and CC, using the handshaking technique described previously, to insure that the compressed data is being received at the decompressor properly.

The serial bit output from shift register 100 is transmitted in parallel to flip-flops 105 and 106, as shown in FIG. 4A. Flip-flop 105 is the address latch for the WB symbol decoder, while flip-flop 106 is the address latch for the BW symbol decoder. These flip-flops can handle a thirteen bit parallel input (decoder PROM address) and are clocked by a signal DD from controller 104. The outputs of flip-flop 105 are connected to a WB decoder PROM 108, while the outputs of flip-flop 106 are connected to a BW decoder PROM 110. PROMs 108 and 110 are both 8K×16 bit memory devices, with PROM 108 containing the decoder branch table for the WB symbols, and PROM 110 containing the decoder branch table for the BW symbols. However, only fourteen of those sixteen output bits are used in decoding the compressed data in this particular embodiment. The first twelve bits, $O_0$ to $O_{11}$, contain the twelve bit data of the valid decoded symbols. Bit $O_{12}$ is a valid symbol indicator; it has the value zero when the current symbol is valid. This bit is transmitted to controller 104 via an inverter gate 112 to indicate that a valid symbol has been captured. Bit $O_{13}$ is used to identify the initial color of the current decoded symbol; it has the value zero for a WB symbol, and has the value one for a BW symbol.

When the special symbol (which indicates the run length has switched from one type of run to the other) is encountered in either the BW or WB table, bits $O_0$ to $O_{11}$ of the PROM will contain all 0's, and bit $O_{12}$ will have the value one. Bit $O_{13}$ will now represent the complement of the initial color of the next decoded symbol; one for a WB symbol, and zero for a BW symbol.

The value of this fourteenth bit ($O_{13}$) directs controller 104 in the operation of PROMs 108 and 110. Using the value of this bit, control unit 104 sends a control signal EE to the chip enable input of PROM 108 for a WB symbol, or to the chip enable input of PROM 110 via an inverter gate 113 for a BW symbol.

In operation, one bit of data is outputted from shift register 100 to the least significant bit of the inputs to flip-flops 105 and 106. Signal DD clocks the data into these flip-flops, and the outputs of each flip-flop address PROMs 108 and 110, respectively. The other twelve bits of the thirteen bit address are obtained from the PROM output. If the decoder is presently sensing WB symbols, PROM 108 will be enabled by control signal EE; if the decoder is sensing BW symbols, the control signal will enable PROM 110 via gate 113. If the address to the PROM does not correspond to a valid symbol, the PROM outputs a one on the $O_{12}$ bit line. Another bit of data is then clocked out of shift register 100 by signal AA to become the least significant bit of the input data to flip-flops 105 and 106, and output lines $O_0$ through $O_{11}$ of the PROM are fed back to the inputs of flip-flops 105 and 106, with $O_0$ now providing the second least significant bit, $O_1$ the third, etc., as shown in FIGS. 4A and 4B, to form a new address for the PROMs. This operation will continue with each bit of data outputted from shift register 100 until a valid symbol is decoded from PROM 108 or 110.

When a valid symbol is finally outputted by one of the PROMs, bit $O_{12}$ will become a zero, and is transmitted to controller 104 via gate 112. Bit $O_{12}$ is also transmitted to the reset input of flip-flops 105 and 106, clearing the outputs to zero. The symbol bits $O_0$ through $O_{12}$ are now transmitted to a flip-flop 114, and are clocked in by a control signal GG from controller 104. The output of flip-flop 114, a 12-bit symbol representing the combined black and white data bits, is transmitted to a flip-flop 116, and is clocked in by a control signal HH from the controller 104. The output of flip-flop 116 is then split into the two halves (white and black) of runs to be decompressed.

The three least significant output bits of flip-flop 116, ($B_0$–$B_2$) represent the black half run of a symbol, while the remaining nine bits, $B_3$–$B_{11}$, represent the white half run. To decompress a symbol, one half of the symbol, representing the initial color, is decompressed first, followed by the other half, representing the other color. For example, in a BW run, the black half is decompressed first, then the white half is decompressed.

The three bits representing the black half are transmitted from flip-flop 116 to an inverter gate 118, which complements these bits and sets a counter 120 with these bits. Counter 120 is a three bit up counter which is clocked by a control signal JJ from the controller 104. Each pulse of signal JJ increments counter 120 one time, and simultaneously controller 104 outputs a one for each of these pulses to an EXCLUSIVE OR gate 122. The output of gate 122 is transmitted to the image data buffer 124, and also to a shift register 126. The length of shift register 126 is the length of one scan line of the image which is being decompressed. Shift register 126 is clocked by a control signal KK from the controller 104, and the output is transmitted to the other input to gate 122. The function of gate 122 is to introduce the line-to-line redundancy (which was removed by gate 22 of the compressor in FIG. 3A) back into the decompressed image in order to obtain the original image data which is then stored in buffer 124.

When counter 120 has counted up to its maximum (all 1's), it sends a signal LL to controller 104, indicating that the black run is completely decompressed. The white run can now be generated, with the nine bits representing the white data ($B_3$–$B_{11}$) transmitted from flip-flop 116 and complemented by an inverter gate 128. The nine bit output of gate 128 is loaded into a counter 130, which is a nine bit up counter. Counter 130 is clocked by a control signal MM from controller 104, which outputs a zero to gate 122 for each pulse of signal MM. The output of gate 122 is transmitted to buffer 124, and also to shift register 126, which is used with gate 122 to reintroduce the line-to-line redundancy and regenerate the original image, which is merely the reverse of the process described previously.

Controller 104 communicates with the buffer 124 as each pixel is received via signals RR and SS, using the handshaking technique described previously, to insure that all data will be received to construct the facsimile image. When counter 130 has reached its maximum, it transmits a signal PP to the controller 104, which indicates that the white run is completely decompressed. The two halves of the WB symbol are decompressed similarly.

The decompressed pixels are transmitted to the image data buffer 124 on a pixel-by-pixel basis, and as the data enters buffer 124, each pixel is counted by a counter 134. The size of counter 134 is equal to the number of bits in one scan line of the original image. When counter 134 has counted to its maximum, it places the next pixel received by buffer 124 in a new scan line. Counter 134 then begins a new count, and this technique continues for all the data buffer 124 receives. In this manner, the decompressed image is reconstructed to appear exactly as the original image.

When the decompression process is complete, the decompressed image is transmitted to an output device 10, where it can be displayed on a CRT screen or printed on a hard copy unit.

While the invention has been shown and described in terms of a preferred embodiment thereof, it will be understood that this invention is not limited to this particular embodiment and that many changes and modifications may be made without departing from the true spirit and scope of the invention as defined in the appended claims.

I claim:

1. An apparatus for the processing of digital data derived from an image, comprising:
   means for converting said digital data into varying run lengths of a first type data indicia and a second type data indicia;
   means for counting said first and second types of data indicia of each run length;
   means responsive to said counting means, for forming a plurality of groups, with each of said groups comprising a section of data representing said first type data indicia and a section of data representing said second type data indicia, said groups constituting digital symbols representative of each of said groups;
   storage means for storing a plurality of code words which are representative of each of said symbols;
   means for causing said code words to be generated from said storage means;
   and means for outputting said generated code words over a transmission medium.

2. The apparatus of claim 1, wherein said code words comprise variable length words.

3. The apparatus of claim 1, wherein said first type data indicia are black and said second type data indicia are white.

4. The apparatus of claim 1, further comprising:
   means for receiving said code words from said transmission medium;
   means, responsive to said receiving means, for storing said code words;
   means for storing a plurality of symbols which are representative of each of said code words, wherein each symbol comprises a section of first type data indicia and a section of second type data indicia;
   means for causing said symbols to be generated from said symbol storing means;
   means for separating said symbols into a first section of first type data indicia and a second section of second type data indicia;
   means for counting said first and second types of data indicia in each section;
   and means for converting said data indicia into a digital image.

5. The apparatus of claim 4, wherein said separating means comprises a storage device.

6. The apparatus of claim 1, wherein a first group comprises a first section of second type data indicia followed by a second section of first type data indicia.

7. The apparatus of claim 2, wherein a second group comprises a first section of first type data indicia followed by a second section of second type data indicia.

8. The apparatus of claim 7, wherein a symbol representing said first group and a symbol representing said second group are separated by a special symbol.

9. The apparatus of claim 7, wherein said first section includes a total of one to a third predetermined number of first type data indicia.

10. The apparatus of claim 9, wherein said second section includes a total of zero to a fourth predetermined number of second type data indicia.

11. The apparatus of claim 10, wherein a single second type data indicium separates said first section from said second section.

12. The apparatus of claim 11, wherein said first section is not separated from said second section by said single second type data indicium whenever data indicia in said second section is exactly equal to said fourth predetermined number.

13. The apparatus of claim 2, wherein said first section includes a total of one to a first predetermined number of second type data indicia.

14. The apparatus of claim 13, wherein said second section includes a total of zero to a second predetermined number of first type data indicia.

15. The apparatus of claim 14, wherein a single first type data indicium separates said first section from said second section.

16. The apparatus of claim 15, wherein said first section is not separated from said second section by said single first type data indicium whenever data indicia in said second section is exactly equal to said second predetermined number.

17. An apparatus for the processing of digital data derived from an image, comprising:
   means for receiving a plurality of code words from a transmission medium;
   means, responsive to said receiving means, for storing said code words;

means for storing a plurality of symbols which are representative of each of said code words, wherein each symbol comprises a section of first type data indicia and a section of second type data indicia;

means for causing said symbols to be generated from said symbol storage means;

means for separating said symbols into a first section of first type data indicia and a second section of second type data indicia;

means for counting said first and second types of data indicia in each section;

and means for converting said data indicia into a digital image.

18. A method for processing digital data derived from an image, comprising the steps of:

receiving a continuous stream of said digital data, wherein said stream consists of varying run lengths of first type and second type data indicia;

separating said digital data into a plurality of groups with each of said groups comprising a section of data representing second type data indicia and a section of data representing first type data indicia;

deriving a digital symbol representative of each of said groups;

inputting each of said digital symbols to a storage device as an address thereof;

outputting from said storage device a code word representative of each of said symbols which are inputted;

and transmitting said code words over a transmission medium.

19. The method of claim 18, wherein the step of receiving a continuous stream of digital data further comprises the step of counting said data indicia of each type in each run length.

20. The method of claim 18, further comprising the steps of:

receiving said code words from said transmission medium;

storing said code words as they are received;

inputting each of said code words to a storage device as an address thereof;

outputting from said storage device a digital symbol representative of each of said code words which are inputted;

separating said digital symbols into a plurality of groups with each of said groups comprising a section of data representing a second type data indicia and a section of data representing a first type data indicia;

counting the data indicia in each of said sections;

and converting said data indicia into a digital image.

21. The method of claim 18, wherein said first type data indicia are black and said second type data indicia are white.

22. A method for processing digital data derived from an image, comprising the steps of:

receiving a plurality of code words from a transmission medium;

generating a plurality of symbols representative of each of said code words, wherein each symbol comprises a section of first type data indicia and a section of second type data indicia, separating said symbols into a first section of first type data indicia and a second section of second type data indicia;

counting said first and second types of data indicia in each section;

and converting said first and second types of data indicia into a digital image.

* * * * *